(12) United States Patent
Yang et al.

(10) Patent No.: US 10,272,923 B2
(45) Date of Patent: Apr. 30, 2019

(54) DRIVER-CENTRIC LEARNING

(71) Applicant: Ford Global Technologies, LLC, Dearborn, MI (US)

(72) Inventors: Hsin-hsiang Yang, Ann Arbor, MI (US); Kwaku O. Prakah-Asante, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 531 days.

(21) Appl. No.: 14/525,358

(22) Filed: Oct. 28, 2014

(65) Prior Publication Data

US 2016/0114805 A1  Apr. 28, 2016

(51) Int. Cl.
*B60W 40/09* (2012.01)
*B60Q 3/80* (2017.01)
*H04W 4/80* (2018.01)

(52) U.S. Cl.
CPC ............... *B60W 40/09* (2013.01); *B60Q 3/80* (2017.02); *H04W 4/80* (2018.02)

(58) Field of Classification Search
CPC ............................. G07C 5/008; G07C 5/0841
USPC .................... 701/1, 29.3, 31.4, 31.5
See application file for complete search history.

(56) References Cited

U.S. PATENT DOCUMENTS

| | | | |
|---|---|---|---|
| 7,170,400 B2 | 1/2007 | Cowelchuk et al. | |
| 8,688,290 B2 | 4/2014 | Jotanotivc | |
| 2009/0157294 A1 | 6/2009 | Geelen et al. | |
| 2009/0216935 A1 | 8/2009 | Flick | |
| 2010/0036560 A1* | 2/2010 | Wright et al. | 701/36 |
| 2014/0046570 A1* | 2/2014 | Mohn et al. | 701/99 |

FOREIGN PATENT DOCUMENTS

| | | |
|---|---|---|
| CN | 103661156 A | 3/2014 |
| JP | 2007-323598 | 12/2007 |

OTHER PUBLICATIONS

Notification of First Office Action issued by State Intellectual Property Office (SIPO) of the People's Republic of China dated Oct. 18, 2018 regarding Application No. 201510703169.8 (3 pages).

* cited by examiner

*Primary Examiner* — Thomas G Black
*Assistant Examiner* — Luat T Huynh
(74) *Attorney, Agent, or Firm* — Frank Lollo; Bejin Bieneman PLC

(57) ABSTRACT

A vehicle system includes a remote device having a processor programmed to receive driver data in real-time during operation of a first vehicle. The processor processes the driver data to determine a driver behavior. A command signal is generated to command a second vehicle to update at least one parameter in accordance with the driver behavior.

20 Claims, 2 Drawing Sheets

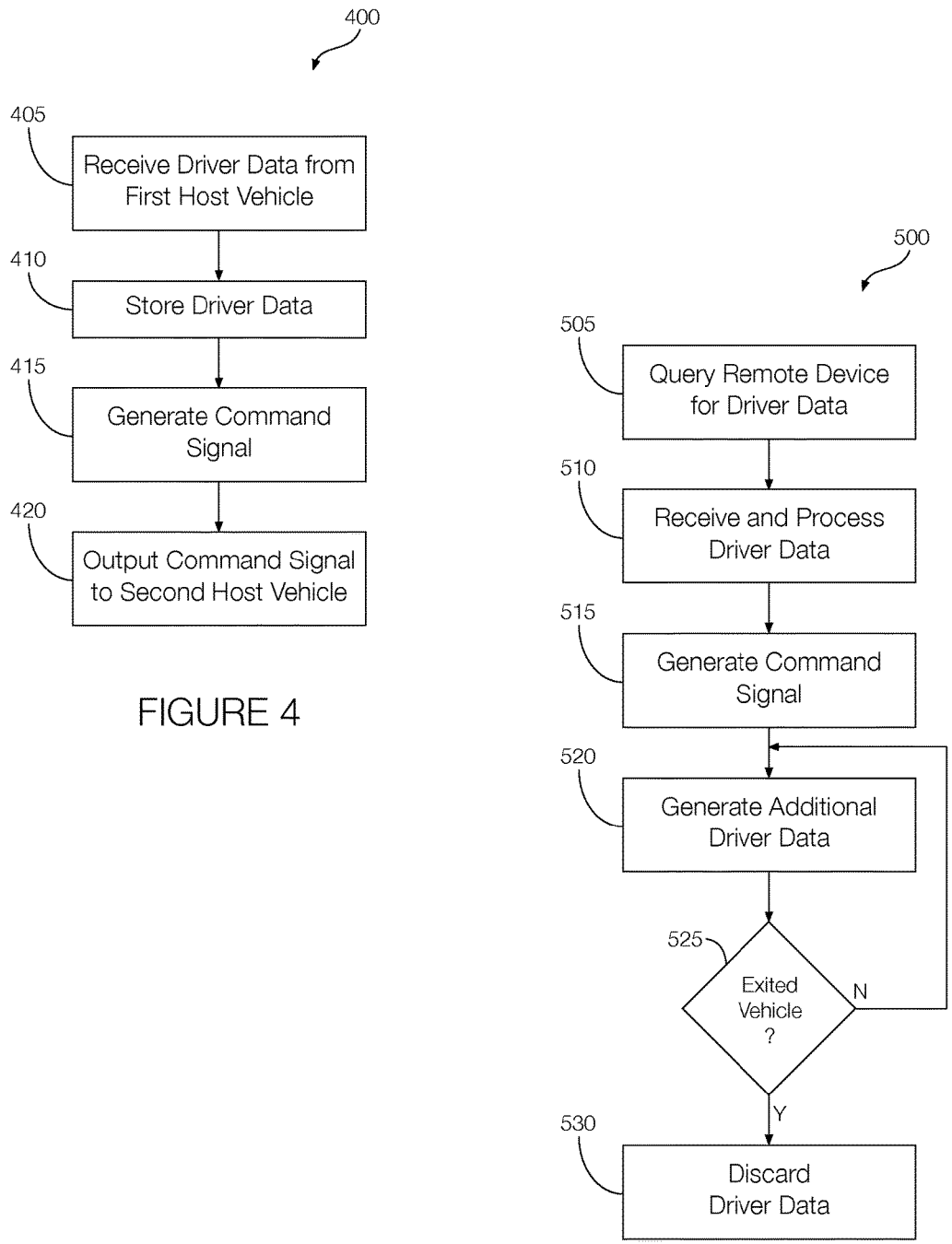

DRIVER-CENTRIC LEARNING

BACKGROUND

Many vehicle characteristics can be customized or adapted to fit an occupant's needs or preferences. For example, upon entering a particular vehicle for the first time, a driver will adjust the seat and mirrors to his or her liking. The driver may also record new radio station presets, adjust the climate control settings, update navigation preferences, change the infotainment display, alter the interior lighting colors, etc. On the vehicle side, vehicle sub-systems may utilize adaptive algorithms to "learn" drivers' preference and behaviors and adjust vehicle control commands accordingly. Such customizations and adaptation increase the occupant's enjoyment of the vehicle. Some vehicles attempt to "remember" a particular driver's customizations and will apply those customizations each time the driver enters the vehicle.

BRIEF DESCRIPTION OF THE DRAWINGS

FIG. 4 is a flowchart of an example process that may be implemented on the remote device to provide the vehicle with parameters.

FIG. 5 is a flowchart of an example process that may be implemented on the vehicle to receive parameters from the remote device.

DETAILED DESCRIPTION

For shared vehicles—that is, vehicles used by multiple drivers—it can be difficult for the vehicle to distinguish who is driving at any particular time. Since different drivers have different preferences, the vehicle may not know which customized settings to apply. Rather than applying customized settings, shared vehicles such as rental cars, fleet vehicles, vehicles involved in car-sharing programs, and even family vehicles with multiple drivers use default settings. An example of a default setting may include the "last-used" setting. Therefore, drivers who often use shared vehicles must constantly change vehicle settings to the driver's preferences.

One way to provide customized settings in shared vehicles involves a vehicle system that receives signals from a remote device. The remote device is carried by its owner when the owner is operating a host vehicle (e.g., a "first vehicle"). The remote device includes a processor programmed to receive driver data in real-time. The processor processes the driver data to determine a driver's typical driving behavior or preferences. When the owner takes the remote device into another vehicle (e.g., a "second vehicle"), a command signal is generated to command a second vehicle to update at least one parameter in accordance with the driver data. The parameter may include, e.g., a driver's preferences. With such a system, any vehicle that can communicate with the remote device will apply the preferences of the driver, making the experience of driving a shared vehicle more enjoyable for the driver.

The elements shown may take many different forms and include multiple and/or alternate components and facilities. The example components illustrated are not intended to be limiting. Indeed, additional or alternative components and/or implementations may be used.

Figure 1:
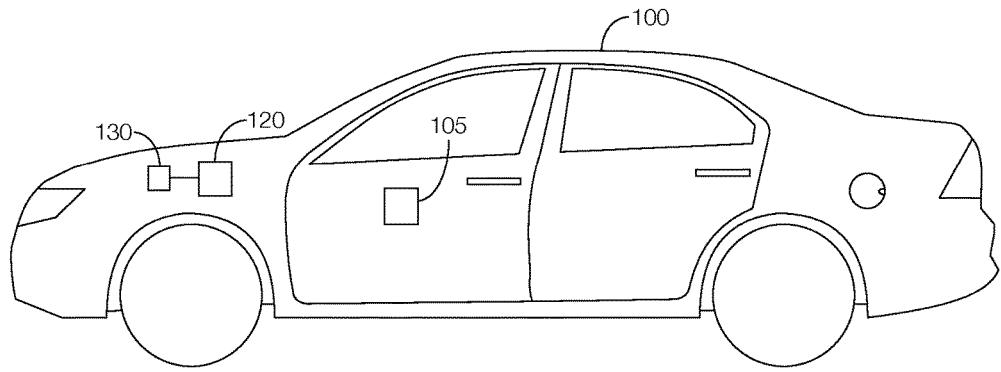
FIG. 1 illustrates an example vehicle that applies parameters based on data received from a remote device.

As illustrated in FIG. 1, an example host vehicle 100 is configured to update certain operating parameters based on signals received from a remote device 105. The operating parameters may be used to define the way particular vehicle subsystems work. For example, operating parameters may define the transmission shifting logic. Some operating parameters may cause the host vehicle 100 to operate in a "sport" mode while other operating parameters may cause the host vehicle 100 to operate in a "fuel-efficiency" mode. Other operating preferences may relate to autonomous vehicle operation. For example, some operating parameters may define how closely the host vehicle 100 follows a "front vehicle" during autonomous operation. In some possible approaches, the operating parameters may relate to occupant preferences such as radio station presets, climate control settings, navigation preferences, infotainment display preferences, interior lighting color preference, etc.

The host vehicle 100 may capture driver data during operation. Driver data may relate to the driver's preferences or may be based on driver's behavior when operating the host vehicle 100. For instance, driver data may be based on, e.g., how aggressively the driver changes lanes, how closely the driver follows a front vehicle, how aggressively the driver accelerates or decelerates the host vehicle 100, or the like. The host vehicle 100 may store the driver data, at least temporarily, in an on-board memory device 130. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle configured to operate in an autonomous (e.g., driverless) mode, a partially autonomous mode, and/or a non-autonomous mode.

The remote device 105 may include a computing device configured to wired or wirelessly pair with the host vehicle 100 and receive the driver data, in real-time, from the host vehicle 100. The remote device 105 may process the driver data to determine a driver's behavior, preferences, or both. Alternatively, the host vehicle 100 may process the driver data, and the remote device 105 may store the processed driver data representing the driver's behavior or preferences.

In one possible approach, the remote device 105 may be a portable device carried by the driver into the host vehicle 100. For example, the remote device 105 may include a mobile device such as a cell phone or tablet computer. Alternatively, the remote device 105 may include a remote server, such as a cloud-based server, in wireless communication with the host vehicle 100. The remote server may process the driver data and transmit parameters, based on the driver data, to the host vehicle 100 or any other vehicle paired with the remote device 105.

Figure 2:
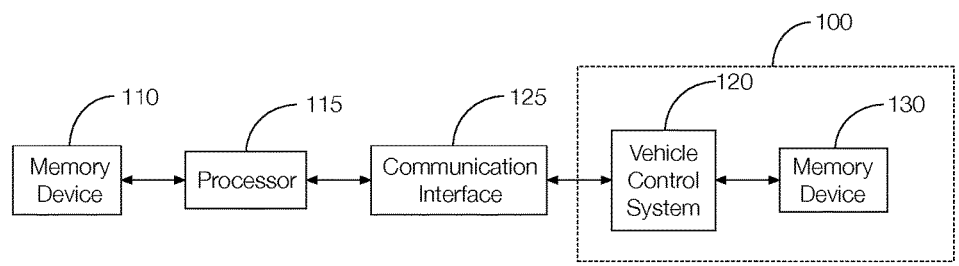
FIG. 2 shows block diagrams of an example remote device in communication with a vehicle.

FIG. 2 shows block diagrams of an example remote device 105 and host vehicle 100. As illustrated, the remote device 105 includes a memory device 110 and a processor 115. The host vehicle 100 includes a vehicle control system 120. The remote device 105 and vehicle control system 120 are configured to communicate over a communication interface 125. The remote device 105 and vehicle control system 120 may be configured to pair with one another via the communication interface 125. The communication interface 125 may be configured to allow the remote device 105 and the vehicle control system 120 to communicate through a wired or wireless communication protocol. For instance, the communication interface 125 may facilitate the transfer of driver data, which may include or represent driver behavior, operating parameters, etc., from the host vehicle 100 to the remote device 105 as well as from the remote device 105 to the host vehicle 100.

The memory device 110 may be programmed to store data such as driver data collected during operation of the host vehicle 100 or other vehicles driven by the owner of the remote device 105. The memory device 110 may be programmed to store the driver data, driver behavior, operating parameters, or any other information. Moreover, the data stored in the memory device 110 may be accessible to the processor 115 and may be communicated to the host vehicle 100 over the communication interface 125.

The processor 115 may be programmed to receive driver data, in real-time, from the vehicle control system 120 over the communication interface 125. In one possible approach, the processor 115 may process the driver data. The processor 115 may be further programmed to associate the driver data with one or more operating parameters. As discussed above, operating parameters may define the transmission shifting logic, causing the host vehicle 100 to operate in a "sport" mode, a "fuel-efficiency" mode, or the like. Other operating parameters may relate to autonomous vehicle operation such as how closely the host vehicle 100 follows a "front vehicle". In some possible approaches, the operating parameters may relate to occupant preferences such as radio station presets, climate control settings, navigation preferences, infotainment display preferences, interior lighting color preference, etc.

In some instances, the driver habits may be collected in real-time from a first vehicle. That is, the driver data may be transmitted from the first vehicle to the processor 115 via the communication interface 125. When the driver exits the first vehicle and takes the remote device 105 into a different vehicle (referred to as a "second vehicle"), the processor 115 may generate and output a command signal to the second vehicle using the communication interface 125. Alternatively, if the remote device 105 includes a remote server, the driver may provide a user input instructing the vehicle control system 120 of the second vehicle to access the driver data from the remote server. In response, the remote server may transmit the command signal. Whether received from the remote device 105 located in the second vehicle or from the remote server, the command signal may cause the vehicle control system 120 of the second vehicle to update operating parameters in accordance with the driver data stored in the memory device 110.

In some instances, the remote device 105 may be programmed to transmit the control signal to the second vehicle in response to a query. For instance, the vehicle control system 120 of the second vehicle may, upon pairing with the remote device 105, transmit a query to the processor 115. The query may request that the processor 115 send one or more operating parameters stored in the memory device 110. The processor 115 may generate and transmit the control signal in response to the query.

Figure 3:
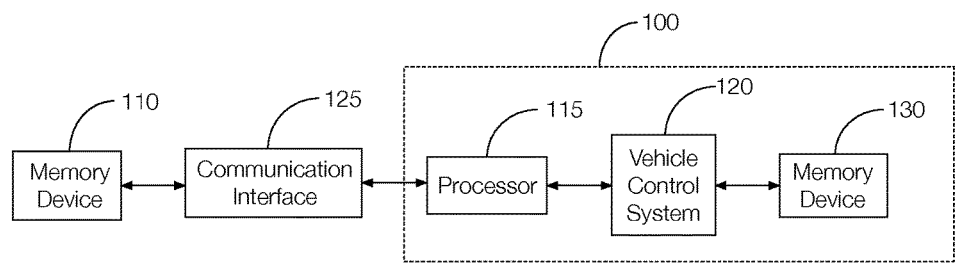
FIG. 3 illustrates block diagrams of another example remote device in communication with a vehicle.

FIG. 3 illustrates block diagrams of another example remote device 105 in communication with a vehicle. In FIG. 3, the processor 115 is incorporated into the host vehicle 100 instead of the remote device 105. In this example approach, the processor 115 may be programmed to query the remote device 105 for the driver data. The remote device 105 may transmit the driver data in response to the query. After receipt of the driver data, the processor 115 may be programmed to process the driver data and generate a command signal commanding the vehicle control system 120 of the host vehicle 100 to update at least one parameter in accordance with the driver data. The processor 115 may receive the driver data via the communication interface 125. As with the communication interface 125 shown in FIG. 2, the communication interface 125 of FIG. 3 may be configured to facilitate communication between the host vehicle 100 and the remote device 105 using any number of wired or wireless communication protocols.

FIG. 4 is a flowchart of an example process 400 that may be implemented on the remote device 105 to provide the host vehicle 100 with parameters.

At block 405, the remote device 105 may receive driver data, in real-time, during operation of a first vehicle, a second vehicle, or any other host vehicle 100. The first vehicle may capture the driver data and transmit the driver data to the remote device 105 via the communication interface 125. The driver data may relate to the driver's preferences or may be based on a driver's behavior—that is, how the driver operates the first vehicle. For instance, driver data may be based on, e.g., how aggressively the driver changes lanes, how closely the driver follows a front vehicle, how aggressively the driver accelerates or decelerates the host vehicle 100, or the like. In some possible implementations, the driver data may be wired or wirelessly communicated from the first vehicle to the remote device 105.

At block 410, the remote device 105 may store the received driver data in a memory device 110. The driver data may be stored in a database so that it may be retrieved by, e.g., the remote device 105 and communicated to the host vehicle 100.

At block 415, the remote device 105 may process the driver data. The driver data may be processed so the remote device 105 can determine a driver's behavior, preferences for operating the host vehicle 100, and driver's preferred operating parameters, etc. The driver's behavior, preferences, and preferred operating parameters may be stored in the memory device 110 and made accessible to other components of the remote device 105, host vehicle 100, or both.

At block 420, the remote device 105 may generate a command signal and output the command signal to a second vehicle via the communication interface 125. The command signal may command the second vehicle to update at least one parameter in accordance with the driver data collected from previous host vehicles 100 as well as from the second vehicle. In some possible approaches, the command signal may be transmitted wirelessly to the second vehicle either automatically by the remote device 105 or in response to a query from the second vehicle. For example, the remote device 105 may automatically transmit the command signal upon pairing with the communication interface 125 of the second vehicle. Alternatively, the second vehicle may query the remote device 105 for the driver data, and the remote device 105 may receive the query, generate the command signal, and transmit the command signal with the driver data in response to the query.

The process 400 may continue at block 405 following block 420. The process 400 may continue to execute until the second vehicle is turned off or until the remote device 105 no longer communicates with the second vehicle.

FIG. 5 is a flowchart of an example process 500 that may be implemented on the host vehicle 100 to receive parameters from a paired remote device 105. The process 500 may execute so long as the host vehicle 100 and remote device 105 are paired through, e.g., the communication interface 125.

At block 505, the host vehicle 100 may query the remote device 105 for driver data. The driver data, as discussed above, may have been collected by the remote device 105 in real-time as the owner drove the host vehicle 100 or other vehicles. The query may include a request from the host vehicle 100 to provide driver data stored in the memory device 110 of the remote device 105.

At block 510, the host vehicle 100 may receive and process the driver data. The driver data may be received via the communication interface 125. As discussed above, the communication interface 125 may be configured to wirelessly receive the driver data from the remote device 105. The driver data may be processed so the host vehicle 100 can determine a driver's behavior, preferences for operating the host vehicle 100, and driver's preferred operating parameters, etc. The driver's behavior, preferences, and preferred operating parameters may be temporarily stored in a memory device 130 of the host vehicle 100 and made accessible to other components of the remote device 105, host vehicle 100, or both.

At block 515, the host vehicle 100 may generate a command signal that commands a system associated with a second vehicle to update at least one parameter in accordance with the driver data received at block 505 and processed at block 510.

At block 520, the host vehicle 100 may generate additional driver data and send the additional driver data, in real-time, to the remote device 105. Moreover, the host vehicle 100 may continue to update the system parameters in accordance with any new driver data generated while the driver is operating the host vehicle 100.

At block 525, the host vehicle 100 may determine whether the owner of the remote device 105 has exited the host vehicle 100. The determination may be based on whether an engine of the host vehicle 100 has been turned off or if the host vehicle 100 is no longer in communication with the remote device 105. If the host vehicle 100 determines that the owner of the remote device 105 has exited, the process 500 may continue at block 530. Otherwise, the process 500 may return to block 520.

At block 530, the host vehicle 100 may discard driver data from the memory device 130 of the host vehicle 100. This way, the host vehicle 100 does not store information about a particular driver unless the remote device 105 associated with the driver is in the host vehicle 100. Further, because the driver data is discarded, the host vehicle 100 will not use one person's driver data when a different person operates the host vehicle 100.

The process 500 may end after block 530.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a remote device having a processor programmed to receive driver data in real-time during operation of a first vehicle, process the driver data, and generate a command signal commanding a system associated with a second vehicle to update at least one parameter in accordance with the driver data,
wherein the system of the second vehicle operates in accordance with the at least one parameter updated in accordance with the driver data received at the second vehicle from the remote device.

2. The vehicle system of claim 1, wherein the remote device further includes a communication interface configured to receive driver data from the first vehicle and transmit the command signal to the second vehicle.

3. The vehicle system of claim 2, wherein the communication interface is configured to wirelessly receive the driver data and wirelessly transmit the command signal to the second vehicle.

4. The vehicle system of claim 2, wherein the communication interface is configured to wirelessly receive driver data from the first vehicle and transmit the driver data to the processor.

5. The vehicle system of claim 1, wherein the remote device includes a mobile device programmed to store the driver data.

6. The vehicle system of claim 1, wherein the remote device includes a remote server programmed to store the driver data.

7. The vehicle system of claim 1, wherein the processor is programmed to receive a query from the second vehicle for the parameter, and wherein the processor is programmed to generate the command signal in response to the query.

8. A vehicle system comprising:
a processor programmed to query a remote device for driver data collected from a first vehicle, process the driver data, and generate a command signal commanding a system associated with a second vehicle to update at least one parameter in accordance with the driver data,
wherein the system associated with the second vehicle is programmed to operate in accordance with the at least one parameter updated in accordance with the driver data received from the remote device.

9. The vehicle system of claim 8, further comprising a communication interface configured to receive the command signal from the remote device.

10. The vehicle system of claim 9, wherein the communication interface is configured to wirelessly receive the driver data from the remote device.

11. The vehicle system of claim 8, wherein the remote device includes a mobile device programmed to store the driver data.

12. The vehicle system of claim 8, wherein the remote device includes a remote server programmed to store the driver data.

13. The vehicle system of claim 8, wherein the remote device is programmed to transmit the driver data to the processor in response to the query.

14. A method comprising:
receiving driver data, via a remote device, in real-time during operation of a first vehicle;
processing the driver data;
generating a command signal commanding a second vehicle to update at least one parameter in accordance with the driver data;
outputting the command signal to the second vehicle; and
operating a system of the second vehicle in accordance with the at least one parameter in updated in accordance with the driver data received from the remote device.

15. The method of claim 14, wherein the driver data is received wireles sly from the first vehicle.

16. The method of claim 14, wherein the command signal is wirelessly transmitted to the second vehicle.

17. The method of claim 14, further comprising storing the driver data in a memory device remote from the first vehicle and the second vehicle.

18. The method of claim 14, further comprising receiving a query from the second vehicle for the driver data.

19. The method of claim 18, further comprising generating the command signal in response to the query.

20. The method of claim 14, further comprising:
determining whether a driver has exited the second vehicle; and
discarding driver data from a memory device associated with the second vehicle.

* * * * *

UNITED STATES PATENT AND TRADEMARK OFFICE
CERTIFICATE OF CORRECTION

PATENT NO. : 10,272,923 B2
APPLICATION NO. : 14/525358
DATED : April 30, 2019
INVENTOR(S) : Hsin-hsiang Yang et al.

Page 1 of 1

It is certified that error appears in the above-identified patent and that said Letters Patent is hereby corrected as shown below:

In the Claims

Column 8, Line 45, replace "with the at least one parameter in updated in" with -- with the at least one parameter updated in --.

Column 8, Line 49, replace "received wireles sly from" with -- received wirelessly from --.

Signed and Sealed this
Tenth Day of December, 2019

Andrei Iancu
*Director of the United States Patent and Trademark Office*